United States Patent
Meyers

(10) Patent No.: US 7,410,256 B2
(45) Date of Patent: Aug. 12, 2008

(54) METHOD AND APPARATUS FOR MARKING EYEGLASS LENS FOR PLACEMENT OF READING SEGMENT

(75) Inventor: Jackie Meyers, Magna, UT (US)

(73) Assignee: OpticTools, LLC, South Jordan, UT (US)

( * ) Notice: Subject to any disclaimer, the term of this patent is extended or adjusted under 35 U.S.C. 154(b) by 290 days.

(21) Appl. No.: 11/386,155

(22) Filed: Mar. 21, 2006

(65) Prior Publication Data

US 2007/0222938 A1    Sep. 27, 2007

(51) Int. Cl.
*A61B 3/10* (2006.01)
(52) U.S. Cl. .................................... 351/204; 351/200
(58) Field of Classification Search ............ 351/45, 351/46, 44, 41, 158, 159, 204, 200
See application file for complete search history.

(56) References Cited

U.S. PATENT DOCUMENTS

| | | | |
|---|---|---|---|
| 1,675,407 A | 7/1928 | Dvorine |
| 1,751,425 A | 3/1930 | Smith |
| 1,981,438 A | 11/1934 | Smith |
| 1,981,439 A | 11/1934 | Smith |
| 2,491,312 A | 12/1949 | Henry et al. |
| 2,536,367 A | 1/1951 | Homles |
| 2,632,257 A | 3/1953 | Belgard |
| 2,884,702 A | 5/1959 | Engelmann |
| 2,884,832 A | 5/1959 | Engelmann |
| 3,740,857 A | 6/1973 | Nerad |
| 3,987,554 A | 10/1976 | Pastore |
| 4,121,346 A | 10/1978 | Grolman et al. |
| 4,160,330 A | 7/1979 | Grolman |
| 4,167,067 A | 9/1979 | Guiset |
| 4,206,549 A | 6/1980 | Gould |
| 4,208,800 A | 6/1980 | Grolman et al. |
| 4,252,419 A | 2/1981 | Padula, II et al. |
| 4,368,958 A | 1/1983 | Buget |
| 4,494,836 A | 1/1985 | Cogez |
| 4,494,837 A | 1/1985 | Bommarito |
| 4,575,946 A | 3/1986 | Bommarito |
| 4,653,192 A | 3/1987 | Conrad et al. |
| 4,653,881 A | 3/1987 | Joncour |
| 4,762,407 A | 8/1988 | Anger et al. |
| 4,944,585 A | 7/1990 | Mizuno |
| 5,036,592 A | 8/1991 | Marshall |
| 5,037,193 A | 8/1991 | Funk |
| 5,046,257 A | 9/1991 | Marshall |
| 5,148,602 A | 9/1992 | Marshall |

(Continued)

OTHER PUBLICATIONS

Bifocal Lens Placement Aid: Upon information and belief of applicants or applicants' attorney, this information represents a product that was in public use or on sale in this country more than one year prior to the date of the application for patent in the United States.

*Primary Examiner*—Hung X Dang
(74) *Attorney, Agent, or Firm*—Thorpe North & Western

(57) ABSTRACT

An eyeglass lens appliqué device for determining placement of at least one auxiliary lens within an eyeglass lens. The lens appliqué device includes a sheet of plastic that can be removably disposed on the eyeglass lens, and is clingable to the eyeglass lens. The plastic sheet includes an outline of at least one auxiliary lens, and scale markings to show a distance from the outline of the auxiliary lens to an approximate peripheral edge of the eyeglass lens.

26 Claims, 5 Drawing Sheets

U.S. PATENT DOCUMENTS

| | | |
|---|---|---|
| 5,167,074 A | 12/1992 | Weiss |
| 5,335,419 A | 8/1994 | Marshall |
| 5,450,335 A | 9/1995 | Kikuchi |
| 5,617,155 A | 4/1997 | Ducarouge et al. |
| 5,640,775 A | 6/1997 | Marshall |
| 5,677,751 A | 10/1997 | Gerber |
| 5,691,799 A | 11/1997 | Ramachandran |
| 5,748,279 A * | 5/1998 | Glanzbergh .................. 351/45 |
| 6,170,952 B1 | 1/2001 | La Haye et al. |
| 6,808,264 B1 | 10/2004 | Hoshino |
| 6,910,769 B2 * | 6/2005 | Renard ........................ 351/164 |

* cited by examiner

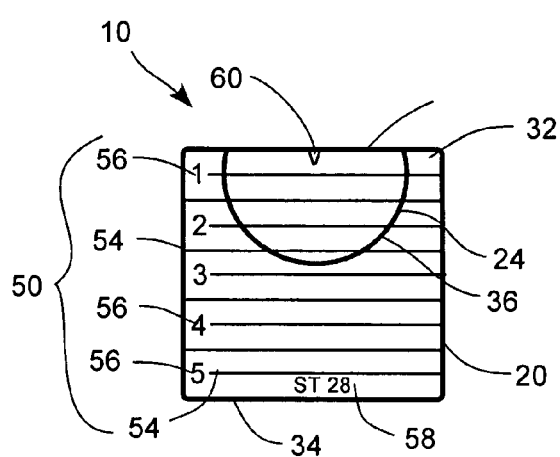
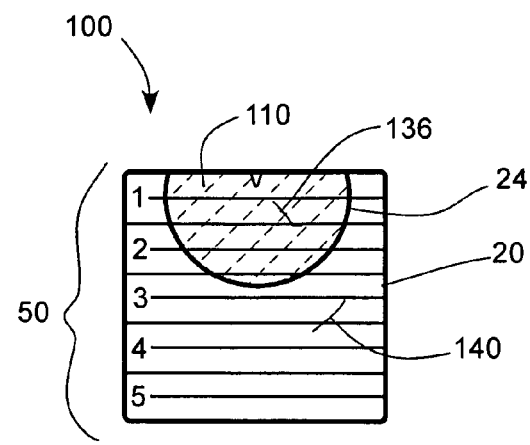
FIG. 1       FIG. 3
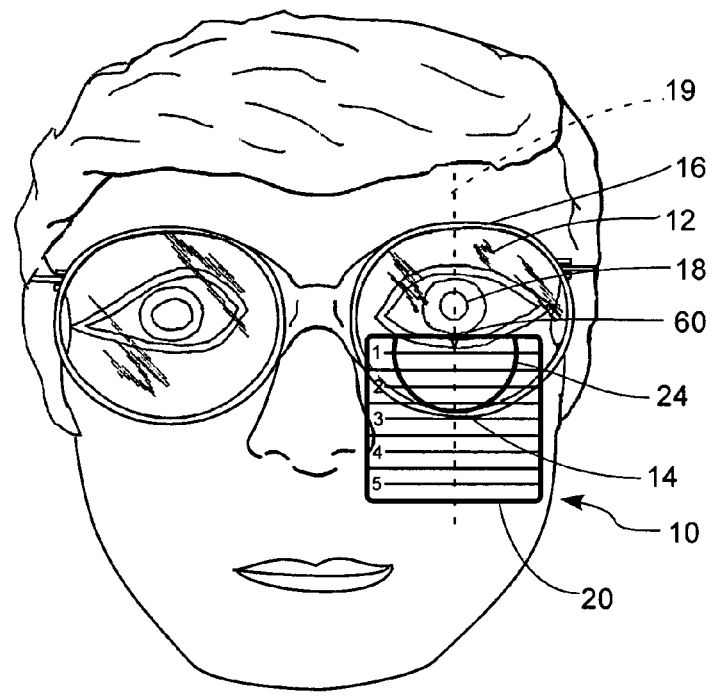
FIG. 2

METHOD AND APPARATUS FOR MARKING EYEGLASS LENS FOR PLACEMENT OF READING SEGMENT

BACKGROUND OF THE INVENTION

1. Field of the Invention

The present invention relates generally to eyeglass lenses and more particularly to preparation of multifocal lenses for eyeglass frames.

2. Related Art

Multifocal lenses for eyeglasses, such as bifocal or trifocal lenses, have a primary lens and at least one auxiliary lens segment having a different focal length than the primary lens. Generally, the auxiliary lens is integrated into the primary lens and located near the bottom of the primary lens. Properly locating the auxiliary lens on the primary lens can be difficult due to differences in the geometry of various eyeglass frames and individual patient anatomy. Moreover, each patient may have personal preferences for the location of the auxiliary lens on the primary lens.

An important factor in determining the location of an auxiliary lens on a primary lens is the segment height of the auxiliary lens. The segment height is the distance from the bottom of the primary lens or eyeglasses frame to the top of the auxiliary lens. Often, the segment height is determined by using a ruler, and measuring the distance from the bottom of the frame or lens to the pupil of the patient. This method is problematic, however, because the optical technician must rely on a best guess as to the most comfortable auxiliary lens location for the patient.

Some attempts have been made to mark an eyeglass lens blank with the patient preferred location for the auxiliary lens. This has been accomplished by marking the lens blank with an indicator, such as a piece of transparent tape, while the patient is wearing the eyeglasses. The glasses are then removed from the patient and the segment height is measured with a ruler. Such methods are inherently inefficient because they have required measuring the segment height after removal of the glasses from the patient. Additionally, the indicators have led to placement errors because they don't accurately simulate the auxiliary lens or are difficult for the patient to see.

SUMMARY OF THE INVENTION

It has been recognized that it would be advantageous to develop a method and device for accurately determining the location of an auxiliary lens in a multifocal eyeglass lens. In addition, it has been recognized that it would be advantageous to develop a method and device to allow an eyeglass patient to view the location of an auxiliary lens in a pair of eyeglass frames before the production of the lens.

The present invention provides an eyeglass lens appliqué device for determining placement of at least one auxiliary lens within an eyeglass lens. The lens appliqué device can include a sheet of plastic that is removably disposable on the eyeglass lens. The plastic sheet can cling to the eyeglass lens by specific or mechanical adhesion. The plastic sheet can also include an outline of at least one auxiliary lens, and scale markings to show distance from the outline of the auxiliary lens to an approximate peripheral edge of the eyeglass lens.

In another aspect, the outline of the auxiliary lens on the plastic sheet and an area enclosed by the outline can be translucent.

The present invention also provides for a method for determining an auxiliary lens location for an eyeglass lens including placing a pair of eyeglasses on a patient. The eyeglasses can have a frame and a pair of lenses within the frame. An appliqué can be applied on at least one of the eyeglass lenses. The appliqué can include an outline of an auxiliary lens and a distance scale. The placement of appliqué can be adjusted based on feedback from the patient with respect to the location of the outline of the auxiliary lens on the eyeglass lens. A scale on the appliqué can be observed in order to determine a distance from the outline of the auxiliary lens to a perimeter of the eyeglasses frame or lens and the distance can be recorded.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1 is a front view of an eyeglass lens appliqué device in accordance with an embodiment of the present invention;

FIG. 2 is a front view of the eyeglass lens appliqué device of FIG. 1 disposed on an eyeglass lens worn by an optical patient;

FIG. 3 is a front view of an eyeglass lens appliqué device in accordance with another embodiment of the present invention;

DETAILED DESCRIPTION

Figures 4A, 4B:
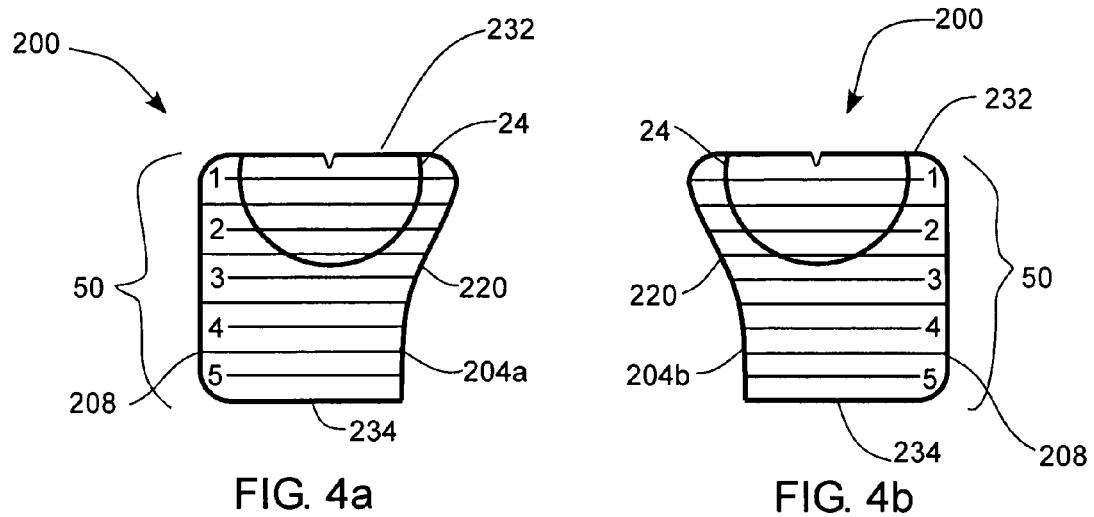
FIG. 4a is a front view of an eyeglass lens appliqué device in accordance with another embodiment of the present invention, configured for a right hand eyeglass lens.
FIG. 4b is a front view of an eyeglass lens appliqué device in accordance with another embodiment of the present invention, configured for a left hand eyeglass lens.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention generally provides for an appliqué that can be removably placed on an eyeglass lens blank to simulate the placement of an auxiliary lens segment, such as a bifocal or trifocal lens, within the eyeglass lens. The appliqué is transparent, but also has an outline of an auxiliary lens that is visually different from the surrounding eyeglass lens blank. The appliqué also has a scale that can be used to determine the distance from a bottom of the eyeglass lens, or a pair of eyeglass frames, to a top of the appliqué. Thus, in use, a patient can wear a pair of chosen eyeglass frames having lens blanks in the frames. The appliqué can be placed on the lens blanks and positioned according to the position of the patient's pupil, and according to feedback from the patient. Once positioned according to the patient's liking, the scale can be read to determine the height of the segment in relation to the bottom of the eyeglass frames or the lens blank.

As illustrated in FIGS. 1-2, an eyeglass lens appliqué device, indicated generally at 10, in accordance with the present invention is shown for use in determining placement of at least one auxiliary lens within an eyeglass lens 12. The appliqué device 10 can have a sheet of plastic 20 that can be removably disposable on the eyeglass lens 12. In one aspect, the plastic sheet 20 can formed from a thin, transparent, flexible vinyl that can cling to the eyeglass lens 12 by specific or mechanical adhesion without chemical adhesives. In one aspect, the plastic sheet can have a thickness between approximately ¼ and 1 millimeter.

The plastic sheet 20 can also include an outline 24 of at least one auxiliary lens. The outline 24 can be a mark on the plastic sheet 20 that is sized and shaped to simulate the location of an auxiliary lens such as a bifocal lens, a trifocal lens, a progressive lens, a multifocal lens, or combinations these lenses, when the plastic sheet 20 is disposed on an eyeglass lens. In one aspect, the outline 24 can be a semi-circle with a substantially straight peripheral edge 28 of the semi-circle disposed along a top peripheral edge 32 of the plastic sheet 20 and the arc 36 of the circle extending into the plastic sheet 20 from the top peripheral edge 32.

The outline 24 can have a different visual appearance than the plastic sheet 20. For example, the outline 24 can be solid, opaque, or translucent in order to provide a definite visual distinction between the outline 24 and the plastic sheet 20.

The plastic sheet 20 can also include scale markings 50. The scale markings 50 can include a plurality of substantially straight lines 54 that extend at least partially across the plastic sheet 20, and are spaced apart from one another a predetermined distance at regular intervals. The scale markings 50 can extend from a top 32 to a bottom 34 of the plastic sheet 20. The scale markings 50 can extend beyond the outline 24, which advantageously facilitates observing the scale markings in relation to the eyeglass lens 12 or frame 16. In one aspect, the lines 54 can extend across the entire plastic sheet 20.

It will be appreciated that the scale markings 50 can be any scale commonly used to measure distances, such as inches, centimeters, millimeters, or the like. Thus, in one aspect, the lines 54 can be disposed at millimeter intervals. For clarity in illustrating the scale on the appliqué, the FIGs. illustrated herein are not drawn to scale.

Additionally, the scale markings 50 can include indicia 56 disposed on the plastic sheet 20 in conjunction with the scale markings 50 in order to visually indicate the distance between the lines 52. The indicia 56 can be numbers that can increase or decrease from the peripheral edge 28 of the outline 24.

The appliqué device 10 can also have size indicia 58 that can indicate the size of the auxiliary lens being simulated by the outline 24. The size indicia 58 can correspond to standard sizes of bifocal, trifocal, or progressive lenses, as known in the art. For example the size indicia 58 illustrated in FIG. 1 can correspond to a bifocal lens with a segment height of 28 millimeters. Other standard sizes, such as 25 and 35 millimeters, can also be indicated by size indicia 58.

The scale markings 50 can also have a different visual appearance than the plastic sheet 20. For example, the scale markings 50 can be solid, opaque, or translucent in order to be visible to an optical technician observing the scale markings 50 in relation to a pair of eyeglass frames or lenses. In use, the scale markings 50 can show a distance from the outline 24 of the auxiliary lens to an approximate peripheral edge 14 of the eyeglass lens 12 or eyeglass frames 16, as shown in FIG. 2.

The appliqué device 10 can also have a pupil mark 60 that can be disposed on the plastic sheet 20. The pupil mark 60 can be centered along the substantially straight peripheral edge 28 of the outline 24. The pupil mark 60 can be an indicator that can be aligned with a patient's pupil 18. In one aspect, the pupil mark 60 can be a small slit extending substantially through the plastic sheet 20.

In use, the pupil mark 60 can be aligned with an approximate vertical centerline, shown by a dashed line at 19, of the pupil 18 prior to initial placement of the appliqué 10 on the eyeglass lens 12. The appliqué 10 can then be placed below the pupil 18 and along the approximate vertical centerline 19 of the pupil. In this way, the pupil mark 60 can bisect the pupil and center the outline 24 about the pupil of the patient.

Additionally, because the appliqué 10 clings to the lens 12 without adhesives, the appliqué 10 can be removed from the eyeglass lens 12 and reapplied in order to correct any misalignment between the pupil mark 60 and the pupil 18, or to adjust the location of the outline according to feedback from the patient. When the appliqué 10 is finally positioned, the scale markings 50 can be observed to determine the segment height. For example, the scale markings 50 on the appliqué 10 in FIG. 2 indicate a segment height of 3 since the straight line 54 associated with the number 3 is located at the approximate bottom of the eyeglasses frame 16.

As illustrated in FIG. 3, an eyeglass lens appliqué device, indicated generally at 100, in accordance with another embodiment of the present invention is shown for use in determining placement of at least one auxiliary lens within an eyeglass lens 12. The lens appliqué device 100 can be similar in many respects to the lens appliqué device 10 described above. The lens appliqué device 100 can include a plastic sheet 20 having an outline 24 of an auxiliary lens and scale markings 50.

Additionally, the area 136 enclosed by the outline 24 can also have a different visual appearance. For example the area 136 inside the outline 24 can be translucent, as shown by dashed lines 110, in order to provide a definite visual distinction between the area 136 inside the outline 24, which simulates the auxiliary lens, and the area 140 outside the outline 24, which can be transparent. Alternatively, the area 136 enclosed by the outline 24 can be transparent, and the area 140 outside the outline 24 can be translucent. In this way, the enclosed area 136 can better simulate an auxiliary lens when placed on an eyeglass lens blank for positioning.

Figure 5:
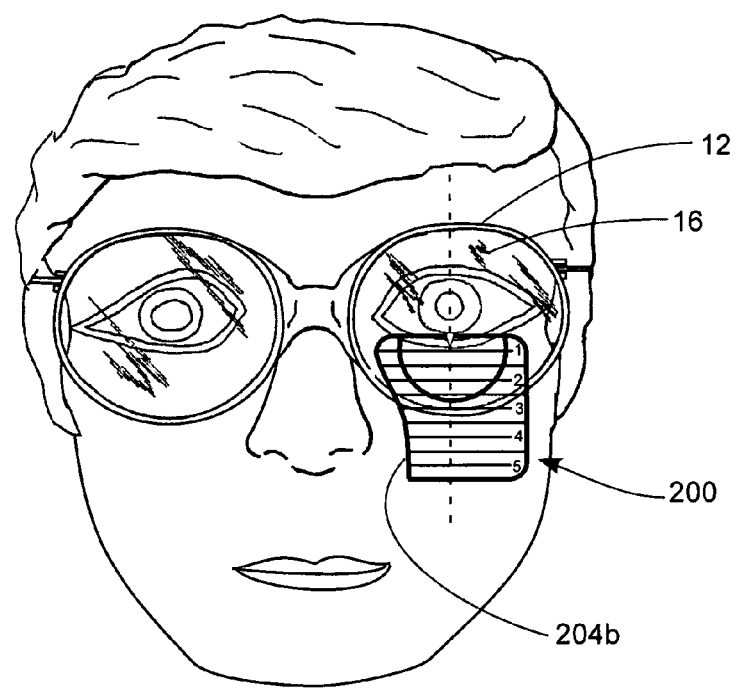
FIG. 5 is a front view of the eyeglass lens appliqué device of FIG. 4b disposed on an eyeglass lens worn by an optical patient.

As illustrated in FIGS. 4a-5, an eyeglass lens appliqué device, indicated generally at 200, in accordance with another embodiment of the present invention is shown for use in determining placement of at least one auxiliary lens within an eyeglass lens 12. The lens appliqué device 200 can be similar in many respects to the lens appliqué device 10 described above and shown in FIGS. 1-2. The lens appliqué device 200 can include a plastic sheet 220 having an outline 24 of an auxiliary lens and scale markings 50.

Additionally, the plastic sheet 220 can have a curved side 204a and 204b. The curved side 204a and 204b can have a smooth curved profile starting near the top peripheral edge 232 of the plastic sheet 220 and curving inward toward the opposite side 208 near the bottom 234 of the plastic sheet. The curved profile of curved side 204a and 204b can fit around the nose of a patient when the appliqué device 200 is placed on a pair of glasses 16, as shown in FIG. 5. Advantageously, the curved profile of the curved side 204a and 204b allows the appliqué device to lay relatively flat against the eyeglass lens 12, thereby providing for a more accurate reading of the scale markings.

Since both the right and left lenses 12 in a pair of eyeglasses may have different placement locations for an auxiliary lens, each lens 12 can be marked with its own appliqué device 200. Accordingly, the curved side 204a can be located to accommodate placement on the eyeglass lens 12 for a right eye, as shown in FIG. 4a. Similarly, the curved side 210b can be located to accommodate placement of the appliqué device 200 on the eyeglass lens 12 for a left eye, as shown in FIGS. 4b and 5. In another aspect, an appliqué device 200 can also have indicia that are readable from either side of the plastic sheet so that placement on either eyeglass lens can be accomplished simply by turning the appliqué device over.

Figure 6:
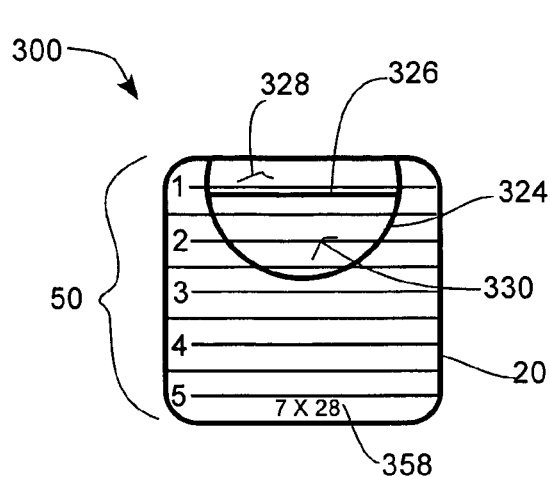
FIG. 6 is a front view of an eyeglass lens appliqué device in accordance with another embodiment of the present invention.

As illustrated in FIG. 6, an eyeglass lens appliqué device, indicated generally at 300, in accordance with another embodiment of the present invention is shown for use in determining placement of at least one auxiliary lens within an eyeglass lens 12. The lens appliqué device 300 can be similar in many respects to the lens appliqué device 10 described above and shown in FIGS. 1-2. The lens appliqué device 300 can include a plastic sheet 20 having an outline 324 of an auxiliary lens and scale markings 50.

Additionally, the outline 324 of the auxiliary lens can include an additional outline marking 326 corresponding is size, shape and location to a trifocal lens. Thus, the outline 324 can outline a first area 328 for a first auxiliary lens and can also outline a second area 330 for a second auxiliary lens.

The appliqué device 300 can also have size indicia 358 that corresponds to the size of a trifocal lens. For example, as shown in FIG. 6, the size of the first area 328 simulating the first auxiliary lens is 7 millimeters, and the size of the second area 330 simulating the second auxiliary lens is 28 millimeters. Indicia 358 can also indicate sizes of other trifocal lens sizes, such as 7×25, and 8×35, as known in the art.

Figure 7:
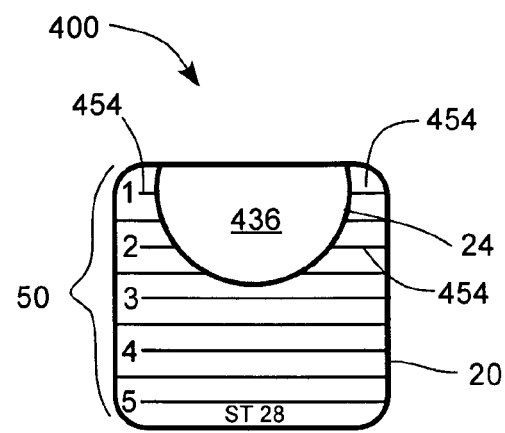
FIG. 7 is a front view of an eyeglass lens appliqué device in accordance with another embodiment of the present invention.

As illustrated in FIG. 7, an eyeglass lens appliqué device, indicated generally at 400, in accordance with another embodiment of the present invention is shown for use in determining placement of at least one auxiliary lens within an eyeglass lens 12. The lens appliqué device 400 can be similar in many respects to the lens appliqué device 10 described above and shown in FIGS. 1-2. The lens appliqué device 400 can include a plastic sheet 20 having an outline 24 of an auxiliary lens and scale markings 450.

The scale markings 450 can extend at least partially across the plastic sheet 20. The straight lines 454 adjacent the outline 24 can stop at the outline 24 and extend into or across the area 436 enclosed by the outline. Thus, the area 436 enclosed by the outline can be substantially free from any type of marking in order to better simulate an auxiliary lens.

Figure 8:
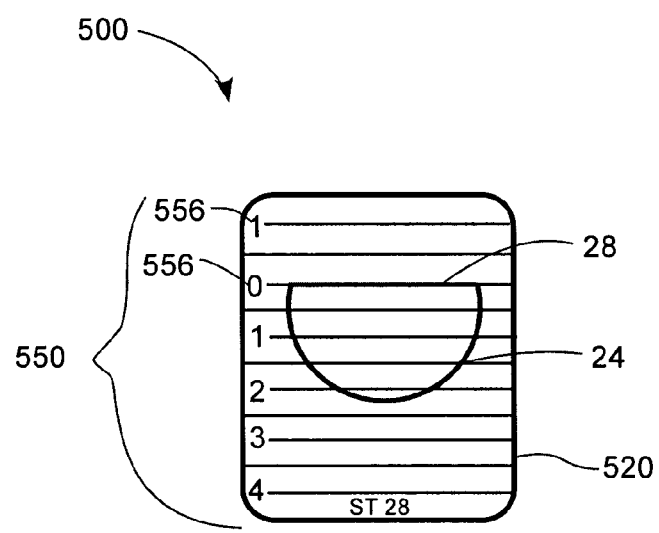
FIG. 8 is a front view of an eyeglass lens appliqué device in accordance with another embodiment of the present invention.

As illustrated in FIG. 8, an eyeglass lens appliqué device, indicated generally at 500, in accordance with another embodiment of the present invention is shown for use in determining placement of at least one auxiliary lens within an eyeglass lens 12. The lens appliqué device 500 can be similar in many respects to the lens appliqué device 10 described above and shown in FIGS. 1-2. The lens appliqué device 500 can include a plastic sheet 520 having an outline 24 of an auxiliary lens and scale markings 550.

Additionally, the plastic sheet can have a portion 510 that extends beyond the straight edge 28 of the outline 24. The scale markings 550 can also extend beyond the straight edge 28. In one aspect, the straight edge 28 can be marked as zero and the indicia 556 can increase in value on either side of the straight edge 28. Thus, the appliqué 500 can advantageously be used to measure a distance from the outline 24 to either an upper or lower peripheral edge of a frame for eyeglasses.

Figure 9:
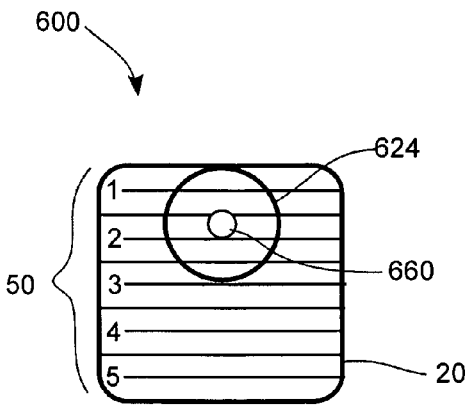
FIG. 9 is a front view of an eyeglass lens appliqué device in accordance with another embodiment of the present invention.

As illustrated in FIG. 9, an eyeglass lens appliqué device, indicated generally at 600, in accordance with another embodiment of the present invention is shown for use in determining placement of at least one auxiliary lens within an eyeglass lens 12. The lens appliqué device 400 can be similar in many respects to the lens appliqué device 10 described above and shown in FIGS. 1-2. The lens appliqué device 600 can include a plastic sheet 20 having an outline 624 of an auxiliary lens and scale markings 50.

Additionally, the outline 620 of the auxiliary lens can correspond in size and shape to a progressive lens. A progressive lens is a multifocal lens with a gradual transition between the portions of the lens with differing focal points. Hence, in a traditional bifocal or trifocal lens a wearer can see a small line denoting where each differing lens begins. In contrast, a progressive lens has a gradual transition that is not visible to the wearer. A progressive lens is usually circular, and so the outline 624 can also be circular.

The appliqué device 600 can also have a pupil mark 660. The pupil mark 660 can be a small hole or aperture that extends through the plastic sheet 20. The hole 660 can be located in the approximate center of the circular outline 624. In use, the hole 660 can be positioned on the lens 12 directly above the pupil of the patient being fitted for glasses.

Figure 10:
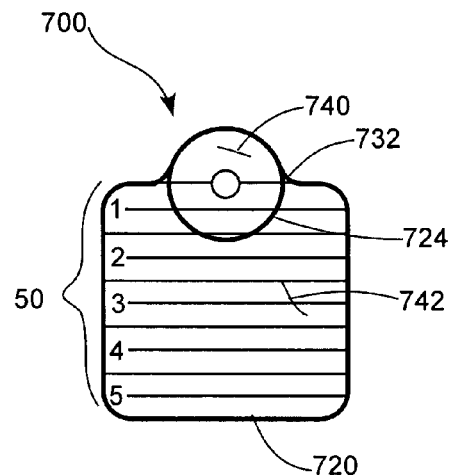
FIG. 10 is a front view of an eyeglass lens appliqué device in accordance with another embodiment of the present invention.

As illustrated in FIG. 10, an eyeglass lens appliqué device, indicated generally at 700, in accordance with another embodiment of the present invention is shown for use in determining placement of at least one auxiliary lens within an eyeglass lens 12. The lens appliqué device 500 can be similar in many respects to the lens appliqué device 400 described above and shown in FIG. 7. The lens appliqué device 700 can include a plastic sheet 720 having an outline 724 of an auxiliary lens and scale markings 50.

Additionally, the plastic sheet 700 can have a top peripheral edge 732 that is shaped around the outline 724 of a progressive lens. Thus, an upper semicircular portion 740 of the progressive lens outline 724 can protrude beyond the top peripheral edge 732. Advantageously, having the upper portion 740 of the progressive lens protrude away from the remaining portion 742 of the appliqué device 700 provides a more realistic simulation for a progressive lens on an eyeglass lens 12 since there is less distraction to the wearer due to markings.

Figure 11:
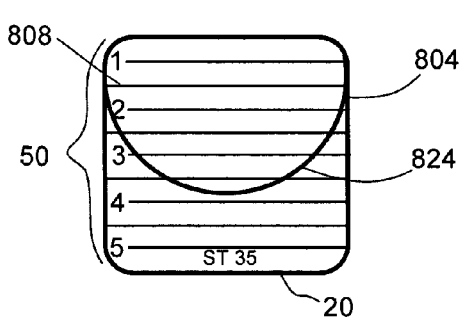
FIG. 11 is a front view of an eyeglass lens appliqué device in accordance with another embodiment of the present invention.

As illustrated in FIG. 11, an eyeglass lens appliqué device, indicated generally at 800, in accordance with another embodiment of the present invention is shown for use in determining placement of at least one auxiliary lens within an eyeglass lens 12. The lens appliqué device 600 can be similar in many respects to the lens appliqué device 10 described above and shown in FIGS. 1-2. The lens appliqué device 800 can include a plastic sheet 20 having an outline 824 of an auxiliary lens and scale markings 50. The outline 824 can extend from one side 804 to the opposite side 808 of the plastic sheet.

Figure 12:
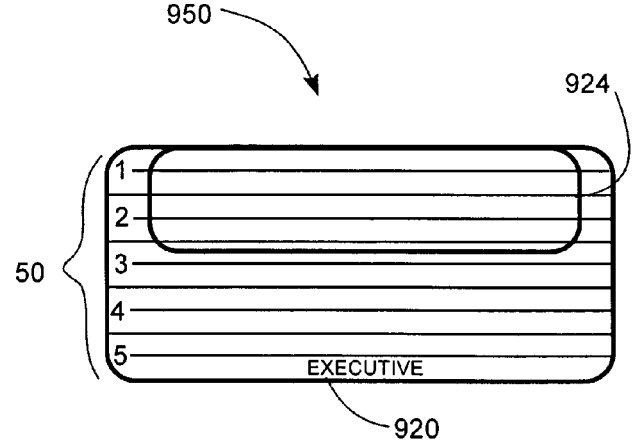
FIG. 12 is a front view of an eyeglass lens appliqué device in accordance with another embodiment of the present invention.

As illustrated in FIG. 12, an eyeglass lens appliqué device, indicated generally at 900, in accordance with another embodiment of the present invention is shown for use in determining placement of at least one auxiliary lens within an eyeglass lens 12. The lens appliqué device 900 can be similar in many respects to the lens appliqué device 10 described above and shown in FIGS. 1-2. The lens appliqué device 900 can include a plastic sheet 920 having an outline 924 of an auxiliary lens and scale markings 950. The lens appliqué device 900 can be sized and shaped to fit a pair or executive style eyeglasses. Executive style eyeglasses can have a quadrangular shape.

Figure 13:
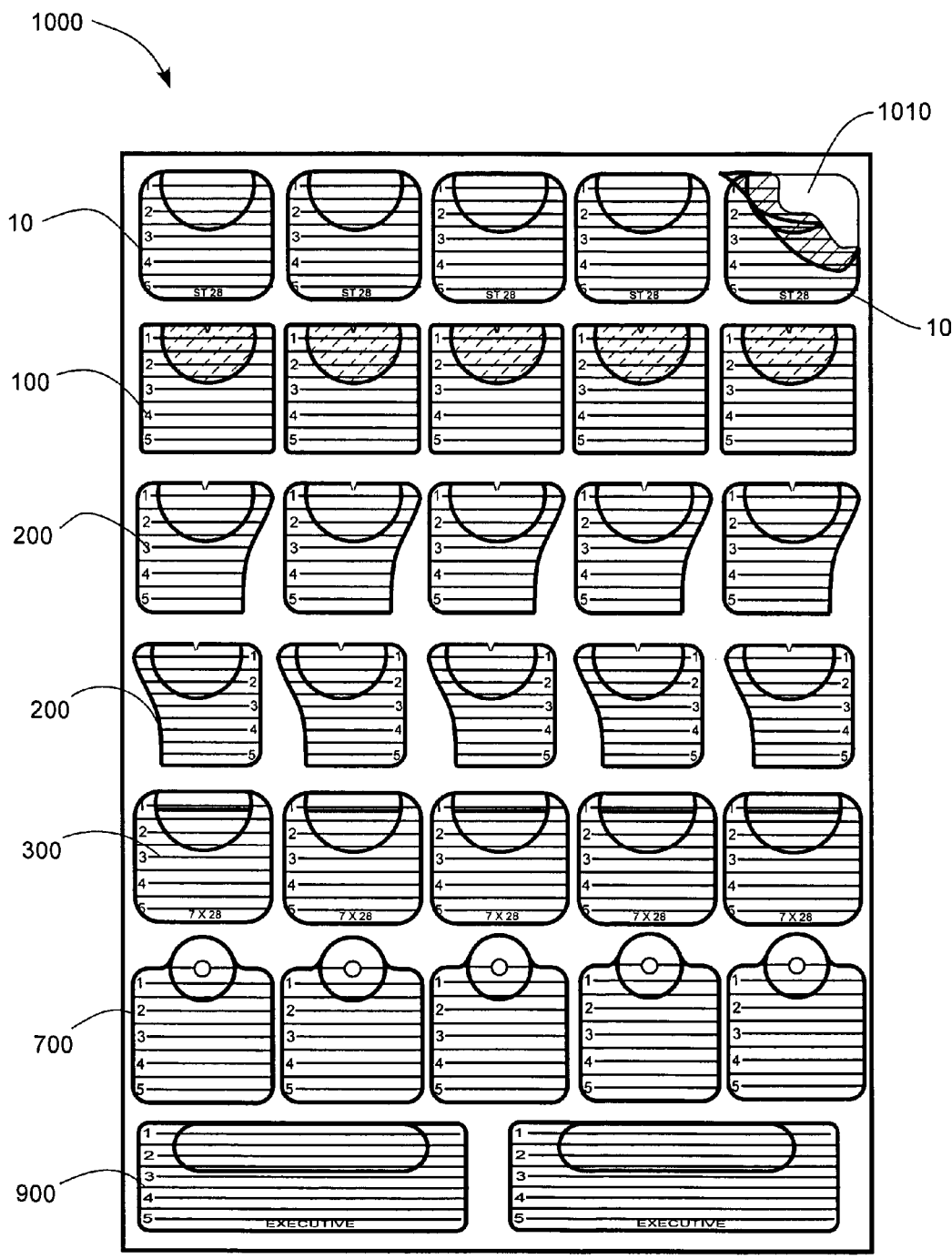
FIG. 13 is a perspective view of a sheet of eyeglass lens appliqué devices in accordance with an embodiment of the present invention.

Referring to FIG. 13, a large plastic sheet 1000 is shown having a variety of the lens appliqué devices 10, 100, 200, 300, 700, and 900, described above, formed on the large plastic sheet. The plastic sheet 1000 can have a backing 1010 to protect the plastic sheet 1000 from dirt in order to maintain the ability of the appliqués to cling to an eyeglass lens by specific mechanical adhesion. Thus, the appliqué devices can be removed from the backing 1010 before being applied to a lens, and FIG. 11 shows an appliqué device 10 being peeled from the backing 1010. Advantageously, the lens appliqué devices of the present invention can all be formed from the same plastic material and so a single sheet of plastic can contain a variety of sizes and shapes of the appliqué devices.

The present invention also provides for a method for determining an auxiliary lens location for an eyeglass lens including placing a pair of eyeglasses on a patient. The eyeglasses can have a frame and a pair of lenses within the frame. An appliqué can be applied on at least one of the eyeglass lenses. The appliqué can include an outline of an auxiliary lens and a distance scale. The placement of appliqué can be adjusted based on feedback from the patient with respect to the location of the outline of the auxiliary lens on the eyeglass lens. A scale on the appliqué can be observed in order to determine a distance from the outline of the auxiliary lens to a perimeter of the eyeglasses frame or lens and the distance can be recorded.

The method can also include aligning a pupil mark associated with the outline of the bifocal lens with the approximate location of the patient's pupil. Additionally, a backing can be removed from the appliqué before the appliqué is applied to the lens.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An eyeglass lens appliqué device for determining placement of at least one auxiliary lens within an eyeglass lens, comprising:
    a) a sheet of plastic, removably disposable on the eyeglass lens, and clingable thereto by specific or mechanical adhesion;
    b) an outline of at least one auxiliary lens on the plastic sheet; and
    c) scale markings, disposed on the plastic sheet to show distance from the outline of the auxiliary lens to an approximate peripheral edge of the eyeglass lens; and
    d) the scale markings including a plurality of substantially straight lines spaced a predetermined distance from one another, each line extending across substantially the entire plastic sheet, and the plurality of lines extending substantially from a top to a bottom of the plastic sheet.

2. A device in accordance with claim 1, wherein the outline of the auxiliary lens and an area of the plastic sheet enclosed by the outline are translucent and an area around the outline of the auxiliary lens is transparent.

3. A device in accordance with claim 1, wherein the outline of the auxiliary lens extends from a top peripheral edge of the plastic sheet, and is sized and shaped to simulate a location of an auxiliary lens on the eyeglass lens when the plastic sheet is disposed thereon, and the scale extends from a top of the plastic sheet to a bottom of the plastic sheet.

4. A device in accordance with claim 1, further comprising:
    a pupil mark, disposed on the plastic sheet, to be aligned with user's pupil.

5. A device in accordance with claim 4, wherein the outline of the auxiliary lens is substantially circular and the pupil mark is at the approximate center of the outline.

6. A device in accordance with claim 4, wherein the pupil mark is at the approximate center of a substantially straight peripheral edge of the outline.

7. A device in accordance with claim 1, wherein the auxiliary lens is selected from the group consisting of a bifocal lens, a trifocal lens, a progressive lens, a multifocal lens, or combinations thereof.

8. A device in accordance with claim 1, wherein the outline of the auxiliary lens is an opaque mark on the sheet of plastic.

9. An eyeglass lens appliqué device for determining placement of a bifocal lens within an eyeglass lens, comprising:
    a) a sheet of plastic, removably disposable on the eyeglass lens, and clingable thereto by specific or mechanical adhesion; and
    b) an outline of an auxiliary lens on the plastic sheet, the outline and an area enclosed by the outline being translucent; and
    c) a pupil mark, disposed on the plastic sheet, to be aligned with user's pupil.

10. A device in accordance with claim 9, further comprising:
    scale markings, disposed on the plastic sheet to show distance from a top peripheral edge of the sheet.

11. A device in accordance with claim 10, wherein the scale markings include a plurality of substantially straight lines spaced a predetermined distance from one another, each line extending across the entire plastic sheet, and the plurality of lines extending from a top to a bottom of the plastic sheet.

12. A device in accordance with claim 9, wherein the outline of the auxiliary lens extends from a top peripheral edge of the plastic sheet, and is sized and shaped to simulate a location of an auxiliary lens on the eyeglass lens when the plastic sheet is disposed thereon.

13. A device in accordance with claim 9, wherein the auxiliary lens is selected from the group consisting of a bifocal lens, a trifocal lens, a progressive lens, a multifocal lens, or combinations thereof.

14. A method for determining an auxiliary lens location for an eyeglass lens, comprising:
    a) placing a pair of eyeglasses on a patient, the eyeglasses having a frame and a pair of lenses within the frame;
    b) applying an appliqué on at least one of the eyeglass lenses, the appliqueé including an outline of an auxiliary lens and a distance scale including a plurality of substantially straight lines spaced a predetermined distance from one another, each line extending across substantially the entire appliqué, and the plurality of lines extending substantially from a top to a bottom of the appliqué;

c) adjusting placement of appliqué based on feedback from the patient with respect to the location of the outline of the auxiliary lens;

d) observing a scale on the appliqué to determine a distance from the outline of the auxiliary lens to a perimeter of the eyeglasses frame; and e) recording the distance.

15. A method in accordance with claim 9, further comprising:

aligning a pupil mark associated with the outline of the bifocal lens with the approximate location of the patient's pupil.

16. A method in accordance with claim 9, wherein the step of applying an appliqué further includes removing a backing from the appliqué.

17. A method in accordance with claim 14, wherein the outline of the auxiliary lens is an opaque mark on the appliqué.

18. An eyeglass lens appliqué device for determining placement of at least one auxiliary lens within an eyeglass lens, comprising:

a) a sheet of plastic, removably disposable on the eyeglass lens, and clingable thereto by specific or mechanical adhesion;

b) an outline of at least one auxiliary lens on the plastic sheet;

c) scale markings, disposed on the plastic sheet to show distance from the outline of the auxiliary lens to an approximate peripheral edge of the eyeglass lens; and d) the outline of the auxiliary lens extending from a top peripheral edge of the plastic sheet, and being sized and shaped to simulate a location of an auxiliary lens on the eyeglass lens when the plastic sheet is disposed thereon, and the scale extending from a top of the plastic sheet to a bottom of the plastic sheet.

19. A device in accordance with claim 18, wherein the outline of the auxiliary lens and an area of the plastic sheet enclosed by the outline are translucent and an area around the outline of the auxiliary lens is transparent.

20. A device in accordance with claim 18, further comprising:

a pupil mark, disposed on the plastic sheet, to be aligned with user's pupil.

21. A device in accordance with claim 18, wherein the scale markings include a plurality of substantially straight lines spaced a predetermined distance from one another, each line extending across the entire plastic sheet, and the plurality of lines extending from a top to a bottom of the plastic sheet.

22. A device in accordance with claim 18, wherein the outline of the auxiliary lens is an opaque mark on the sheet of plastic.

23. An eyeglass lens appliqué device for determining placement of a bifocal lens within an eyeglass lens, comprising:

a) a sheet of plastic, removably disposable on the eyeglass lens, and clingable thereto by specific or mechanical adhesion;

b) an outline of an auxiliary lens on the plastic sheet, the outline and an area enclosed by the outline being translucent; and c) scale markings, disposed on the plastic sheet to show distance from a top peripheral edge of the sheet.

24. A device in accordance with claim 23, wherein the scale markings include a plurality of substantially straight lines spaced a predetermined distance from one another, each line extending across the entire plastic sheet, and the plurality of lines extending from a top to a bottom of the plastic sheet.

25. A device in accordance with claim 23, further comprising:

a pupil mark, disposed on the plastic sheet, to be aligned with user's pupil.

26. A device in accordance with claim 23, wherein the outline of the auxiliary lens is an opaque mark on the sheet of plastic.

* * * * *